(12) United States Patent
Tomofuji

(10) Patent No.: US 10,194,037 B2
(45) Date of Patent: Jan. 29, 2019

(54) IMAGE FORMING SYSTEM AND IMAGE FORMING APPARATUS

(71) Applicant: KYOCERA Document Solutions Inc., Osaka (JP)

(72) Inventor: Shinji Tomofuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/854,227

(22) Filed: Dec. 26, 2017

(65) Prior Publication Data

US 2018/0183951 A1 Jun. 28, 2018

(30) Foreign Application Priority Data

Dec. 28, 2016 (JP) ................... 2016-256858

(51) Int. Cl.
*H04N 1/00* (2006.01)
*G06F 3/12* (2006.01)

(52) U.S. Cl.
CPC ....... *H04N 1/00244* (2013.01); *G06F 3/1236* (2013.01); *G06F 3/1286* (2013.01); *G06F 3/1287* (2013.01); *G06F 3/1288* (2013.01); *H04N 1/00973* (2013.01); *H04N 2201/001* (2013.01); *H04N 2201/0039* (2013.01); *H04N 2201/0075* (2013.01); *H04N 2201/0094* (2013.01)

(58) Field of Classification Search
CPC .................................................. H04N 1/00244
USPC ........................................................ 358/1.15
See application file for complete search history.

(56) References Cited

U.S. PATENT DOCUMENTS 7,408,659 B2* 8/2008 Toda ..................... G06F 3/1205
358/1.15
7,599,919 B2* 10/2009 Oguri ................ G06F 17/30637

FOREIGN PATENT DOCUMENTS

JP 2008-221626 A 9/2008

* cited by examiner

*Primary Examiner* — Jacky X Zheng
(74) *Attorney, Agent, or Firm* — Studebaker & Brackett PC

(57) ABSTRACT

An image forming apparatus includes a first communication section, storage, and a first controller. The storage stores therein history information. When a job is selected as a selected job, the first controller selects a supposed user from the history information on the basis of the selected job, and sends an inquiry message to a terminal device of the supposed user to inquire whether or not the supposed user has particular recording paper. Each terminal device includes a second controller. When information indicating presence or absence of the particular recording paper is input as an answer to the inquiry message, the second controller sends the information indicating presence or absence of the particular recording paper to the image forming apparatus.

15 Claims, 11 Drawing Sheets

| Job instruction time | Job execution time | Address information | Job details |
|---|---|---|---|
| AM 10:10 | AM 10:15 | Address and name of user B | A4, color |
| PM 01:20 | PM 01:12 | Address and name of user A | A4, monochrome |
| PM 02:45 | PM 02:50 | Address and name of user B | A3, color |
| PM 02:55 | PM 02:57 | Address and name of user B | A4, monochrome |
| ... | ... | ... | ... |

FIG. 6

IMAGE FORMING SYSTEM AND IMAGE FORMING APPARATUS

INCORPORATION BY REFERENCE

The present application claims priority under 35 U.S.C. § 119 to Japanese Patent Application No. 2016-256858, filed on Dec. 28, 2016. The contents of this application are incorporated herein by reference in their entirety.

BACKGROUND

The present disclosure relates to: an image forming system in which an image forming apparatus that forms an image on recording paper is connected to a plurality of terminal devices via a network; and the image forming apparatus. Particularly, the present disclosure relates to a technique for assisting a search for recording paper on which an image has been formed and which has been taken away from an image forming apparatus by mistake.

In an image forming system in which an image forming apparatus is connected to a plurality of terminal devices via a network, jobs are sent from the respective terminal devices to the image forming apparatus via the network and successively executed by the image forming apparatus. For example, the image forming apparatus executes as a job, a series of processing by which a print page is printed on recording paper and the recording paper is ejected to an exit tray.

However, a user not always immediately takes away the recording paper from the exit tray. Sometimes, recording paper of a plurality of users is left on the exit tray. In this situation, recording paper on the exit tray may be taken away by a user other than a user by whom the recording paper should be taken away.

Therefore, a traditionally known image forming apparatus stores history information of jobs in storage. When a user by whom recording paper should have been taken away operates an operation panel to display history information of a job executed in accordance with an instruction from the user on a display and designates the job, the image forming apparatus selects jobs each executed before or after the designated job, and sends an inquiry message to terminal devices of those who have given instructions for executing the selected jobs, that is, terminal devices of other users who may have taken away the recording paper by mistake.

SUMMARY

An image forming system according to an aspect of the present disclosure includes an image forming apparatus and a plurality of terminal devices connected to the image forming apparatus via a network. The image forming apparatus includes an image forming section, a first display, a first operation section, a first communication section, an exit tray, storage, and a first controller. The image forming section forms an image on recording paper. The first operation section receives an instruction to the image forming apparatus. The first communication section performs communication with each of the terminal devices via the network. The exit tray receives recording paper ejected after image formation thereon by the image forming section. The storage stores therein history information in which each job for forming an image on recording paper is associated with a user who has instructed the image forming apparatus to execute the job. When an instruction for searching for particular recording paper taken away from the exit tray is given through an operation on the first operation section, the first controller reads out the history information from the storage, and displays the history information on the first display. When from among a plurality of jobs included in the history information, a job is selected through an operation on the first operation section as a selected job performed on the particular recording paper as a target of the search, the first controller selects from the history information a supposed user supposed to have taken away the particular recording paper from the exit tray on the basis of the selected job, and sends an inquiry message to a terminal device of the supposed user through the first communication section via the network to inquire whether or not the supposed user has the particular recording paper. The terminal devices each include a second display, a second operation section, a second communication section, and a second controller. The second operation section receives an instruction to the terminal device. The second communication section performs communication with the image forming apparatus via the network. When the inquiry message is received by the second communication section, the second controller displays the inquiry message on the second display. When information indicating presence or absence of the particular recording paper is input as an answer to the inquiry message through an operation on the second operation section, the second controller sends the information indicating presence or absence of the particular recording paper through the second communication section to the image forming apparatus via the network.

An image forming apparatus according to another aspect of the present disclosure is connected to a plurality of terminal devices via a network. The image forming apparatus includes an image forming section, a first display, a first operation section, a first communication section, an exit tray, storage, and a first controller. The image forming section forms an image on recording paper. The first operation section receives an instruction to the image forming apparatus. The first communication section performs communication with each of the terminal devices via the network. The exit tray receives recording paper ejected after image formation thereon by the image forming section. The storage stores therein history information in which each job for forming an image on recording paper is associated with a user who has instructed the image forming apparatus to execute the job. When an instruction for searching for particular recording paper taken away from the exit tray is given through an operation on the first operation section, the first controller reads out the history information from the storage, and displays the history information on the first display. When from among a plurality of jobs included in the history information, a job is selected through an operation on the first operation section as a selected job performed on the particular recording paper as a target of the search, the first controller selects from the history information a supposed user supposed to have taken away the particular recording paper from the exit tray on the basis of the selected job, and sends an inquiry message to a terminal device of the supposed user through the first communication section via the network to inquire whether or not the supposed user has the particular recording paper.

BRIEF DESCRIPTION OF THE DRAWINGS

FIG. 6 is a diagram illustrating an example of history information of jobs executed by the image forming apparatus.

DETAILED DESCRIPTION

The following describes an image forming system according to an embodiment of the present disclosure with reference to the drawings.

Figure 1:
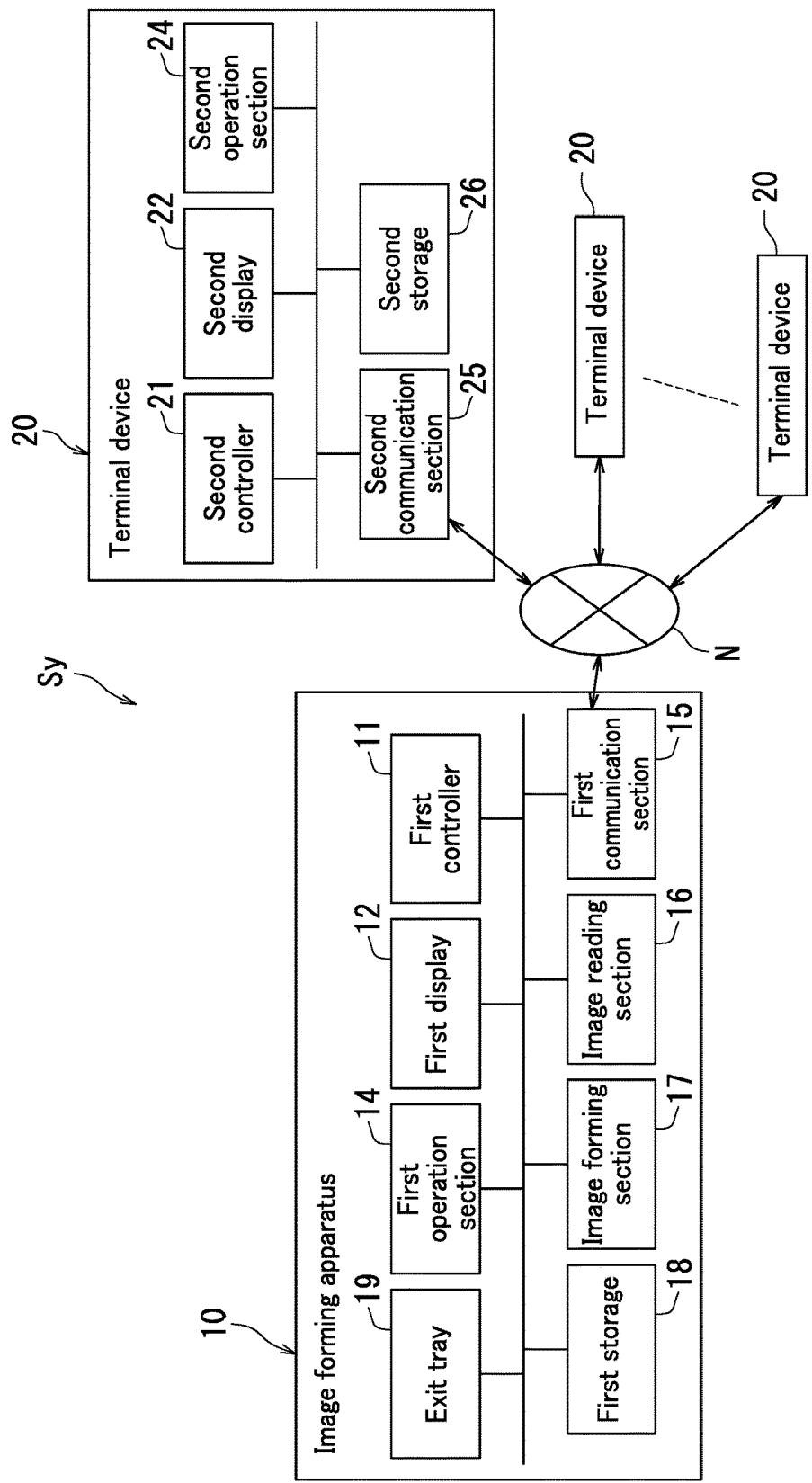
FIG. 1 is a block diagram illustrating an image forming system according to an embodiment of the present disclosure.

FIG. 1 is a block diagram illustrating an image forming system Sy. The image forming system Sy includes an image forming apparatus 10 and a plurality of terminal devices 20. The image forming apparatus 10 is connected to the plurality of terminal devices 20 via a network N. The image forming apparatus 10 is a multifunction peripheral having a plurality of functions such as a copy function, a printer function, a scanner function, and a facsimile function. The terminal devices 20 are personal computers, for example. The network N includes a LAN, a public line, and the Internet. The network N enables data communication between the image forming apparatus 10 and each of the terminal devices 20.

The image forming apparatus 10 includes a first controller 11, a first display 12, a first operation section 14, a first communication section 15, an image reading section 16, an image forming section 17, first storage 18, and an exit tray 19.

The first controller 11 includes processors such as a central processing unit (CPU) and a micro processing unit (MPU). The first controller 11 controls each element of the image forming apparatus 10. Specifically, the processors of the first controller 11 control each element of the image forming apparatus 10 through execution of a computer program stored in the first storage 18.

The first operation section 14 includes a plurality of hard keys and a touch panel disposed over a screen of the first display 12. The first operation section 14 is operated by a user. The first operation section 14 receives an instruction to the image forming apparatus 10. The first operation section 14 receives input of information indicating an instruction for executing an operation for forming an image, information indicating an instruction for executing an operation for reading an image, and various other information. The first operation section 14 outputs the received information to the first controller 11.

The first display 12 includes a liquid crystal display (LCD), for example. The first display 12 displays a screen in accompaniment with execution of an application program. The first display 12 displays a screen for inputting settings necessary for image forming processing or a screen for inputting information.

The first communication section 15 performs communication with each of the terminal devices 20 via the network N. The first communication section 15 is connected to each of the terminal devices 20 via the network N. The first communication section 15 receives print data or the like from each of the terminal devices 20. The first communication section 15 sends various data to each of the terminal devices 20. The first storage 18 stores therein various application programs and various information.

The image reading section 16 includes a scanner. The scanner optically reads an image of a document placed on a contact glass. The image reading section 16 generates image data corresponding to the read image.

The image forming section 17 includes a photosensitive drum, a charger, a light exposure device, a developing device, and a transfer device. The charger uniformly charges a surface of the photosensitive drum. The light exposure device exposes the surface of the photosensitive drum to light to form an electrostatic latent image on the surface of the photosensitive drum. The developing device develops the electrostatic latent image on the surface of the photosensitive drum into a toner image. The transfer device transfers the toner image (image) on the surface of the photosensitive drum onto recording paper as a recording medium. The image forming section 17 forms an image on recording paper. For example, the image forming section 17 forms a print page and/or an image read by the image reading section 16 on the recording paper. The print page is indicated by print data received from a computer, for example. The image read by the image reading section 16 is indicated by image data generated by the image reading section 16.

The exit tray 19 receives recording paper ejected after image formation thereon by the image forming section 17.

The terminal devices 20 each include a second controller 21, a second display 22, a second operation section 24, a second communication section 25, and second storage 26.

The second controller 21 includes processors such as a central processing unit (CPU) and a micro processing unit (MPU). The second controller 21 controls each element of the terminal device 20. Specifically, the processors of the second controller 21 control each element of the terminal device 20 through execution of a computer program stored in the second storage 26.

The second operation section 24 includes a keyboard, a mouse, and a touch panel disposed over a screen of the second display 22. The second operation section 24 is operated by a user. The second operation section 24 receives an instruction to the terminal device 20. The second operation section 24 receives information input by a particular user, information indicating an instruction necessary for executing an application program, and various other information. The particular user refers to a user who causes the image forming apparatus 10 to execute a job. The second operation section 24 outputs the received information to the second controller 21.

The second display 22 includes a liquid crystal display (LCD), for example. The second display 22 displays a screen in accompaniment with execution of an application program.

The second communication section 25 is connected to the image forming apparatus 10 via the network N. The second communication section 25 sends image data to the image forming apparatus 10. The second communication section 25 sends various data to the image forming apparatus 10. The second storage 26 stores therein various application programs and various information.

In the image forming system Sy, jobs are sent from the respective terminal devices 20 to the image forming apparatus 10 via the network N. The image forming apparatus 10 executes the jobs received via the network N. For example, when a particular job is input through an operation by a user on the second operation section 24 while an application program is being executed by the first controller 11, the second communication section 25 of the terminal device 20 sends particular print data to the image forming apparatus 10 via the network N. The particular print data refers to print data indicating a print page including text, a figure, and/or an image generated by the application program. The particular job refers to a job that causes image formation on the basis of the particular print data.

In the image forming apparatus 10, the first communication section 15 receives the print data. Then, the first controller 11 generates the print page to be printed through analysis of the print data. Then, the image forming section 17 forms the print page on recording paper. Then, the recording paper is ejected to the exit tray 19. The user of the terminal device 20 goes to the image forming apparatus 10 to get their recording paper from the exit tray.

Sometimes, recording paper printed through execution of jobs sent from respective terminal devices 20 of a plurality of users is left on the exit tray 19 of the image forming apparatus 10. In this situation, recording paper on the exit tray may be taken away by a user other than the owner of the recording paper.

Therefore, the image forming system Sy of the present embodiment assists a search for recording paper taken away by mistake so that the recording paper will be immediately returned to the owner of the recording paper. The search for the recording paper is assisted as summarized below. Note that the recording paper as a target of the search will be referred to as particular recording paper. Further, a user supposed to have taken away the particular recording paper from the exit tray 19 will be referred to as a user (a supposed user) B.

When the owner of the particular recording paper gives an instruction for searching for the particular recording paper through an operation on the first operation section 14, the image forming apparatus 10 identifies terminal devices 20 of the users B. Then, a list of addresses of the terminal devices 20 of the users B is generated and displayed. Further, an inquiry message is sent to the terminal devices 20 of the users B via the network N to inquire whether or not the users B have the particular recording paper.

The terminal devices 20 of the users B each receive and display the inquiry message. When an answer to the inquiry message is input through the second operation section 24, the answer to the inquiry message is sent to the image forming apparatus 10 via the network N. Specifically, the answer to the inquiry message is an answer to the inquiry as to whether or not the user B has the particular recording paper.

The image forming apparatus 10 receives and displays answers from the terminal devices 20 of the users B. Also, the list of the addresses of the terminal devices 20 of the users B is updated on the basis of the answers from the terminal devices 20 of the users B. Further, the updated list of the addresses and the answers to the inquiry message are sent from the image forming apparatus 10 to the terminal device 20 of the owner of the particular recording paper via the network N. The updated list of the addresses and the answers to the inquiry message are also displayed by the terminal device 20 of the owner of the particular recording paper.

The owner of the particular recording paper will be referred to as a user A. Further, a user who has not taken away the particular recording paper though supposed to have taken away the particular recording paper will be referred to as a user Ba. Also, a user who is supposed to have taken away the particular recording paper and who has taken away the particular recording paper will be referred to as a user Bb. The users B include the user Ba and the user Bb.

Figure 2:
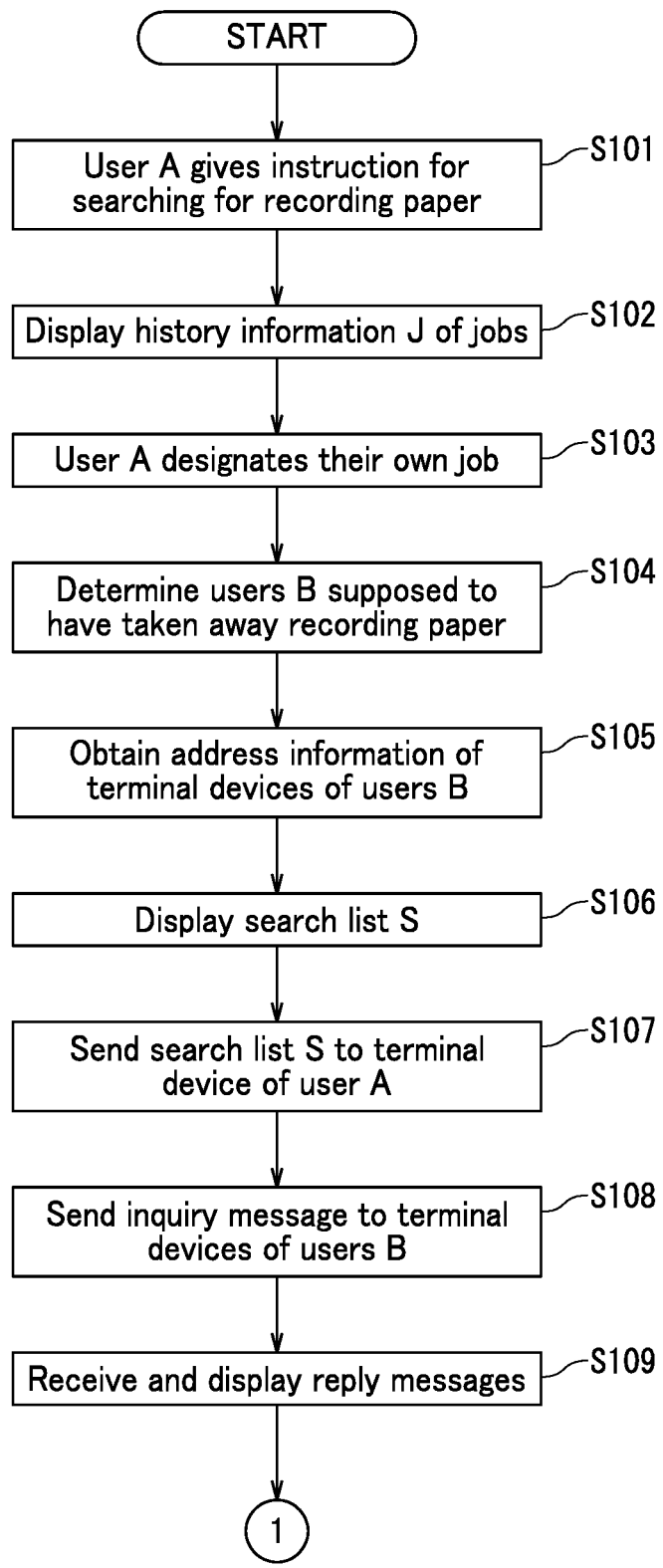
FIG. 2 is a first flowchart illustrating a processing procedure performed by an image forming apparatus in order to assist a search for recording paper.
Figure 3:
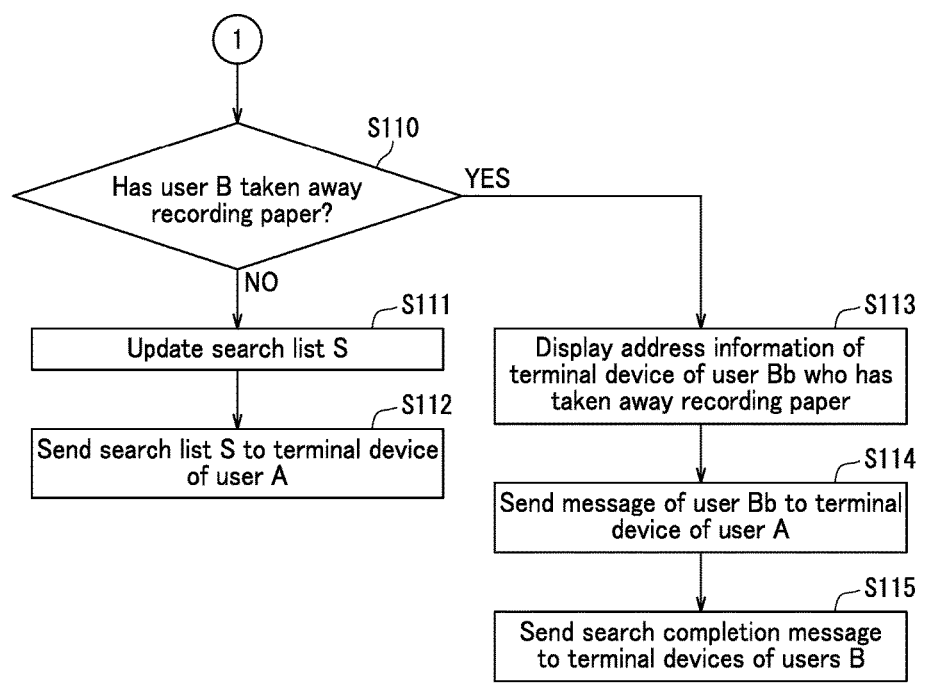
FIG. 3 is a second flowchart illustrating a processing procedure performed by the image forming apparatus in order to assist a search for recording paper.
Figure 4:
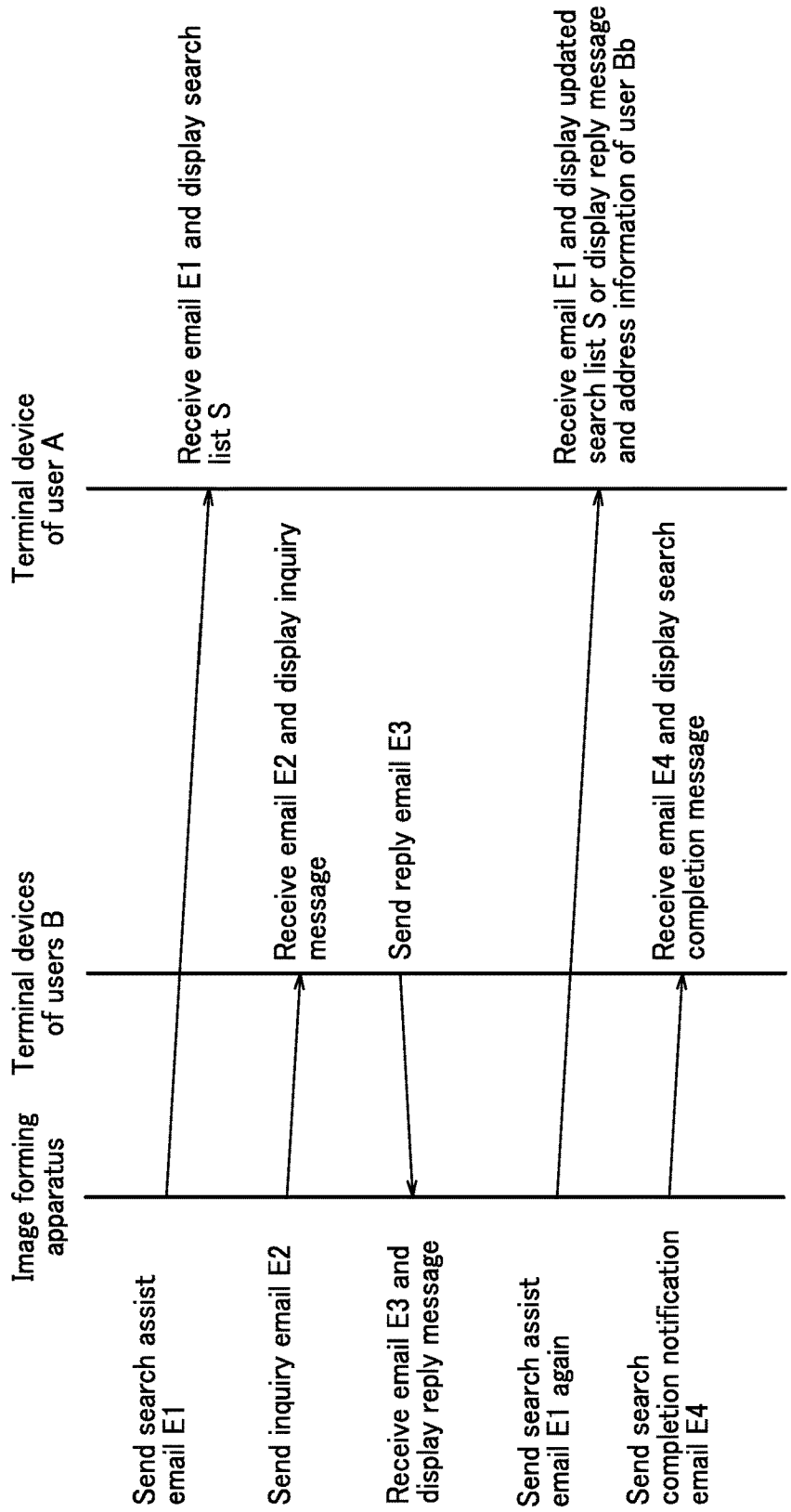
FIG. 4 is a diagram schematically illustrating a procedure of communication performed between the image forming apparatus and each terminal device.

Next, the following describes a processing procedure performed by the image forming apparatus 10 and a processing procedure performed by each of the terminal devices 20. FIG. 2 is a first flowchart illustrating the processing procedure performed by the image forming apparatus 10. FIG. 3 is a second flowchart illustrating the processing procedure performed by the image forming apparatus 10. FIG. 4 is a diagram schematically illustrating a procedure of communication performed between the image forming apparatus 10 and the respective terminal devices 20 of the user A and the users B.

First, when the user A inputs a job to the terminal device 20 of the user A to give an instruction for executing image formation on the basis of print data, information indicating the job is sent from the terminal device 20 of the user A to the image forming apparatus 10 via the network N. When receiving the information indicating the job and the print data of an image to be formed through execution of the job, the image forming apparatus 10 forms a print page indicated by the print data on recording paper. Then, the image forming apparatus 10 ejects the recording paper to the exit tray. In this state, the user A goes to the image forming apparatus 10.

At this time, if the recording paper of the user A on which the print page has been formed is not on the exit tray 19, the recording paper of the user A may have been taken away by another user by mistake. In this situation, the user A inputs an instruction for requesting a search for the particular recording paper taken away from the exit tray through an operation on the first operation section 14 of the image forming apparatus 10. Through the above, the instruction for requesting a search for the particular recording paper is input to the image forming apparatus 1 (step S101).

Figure 5:
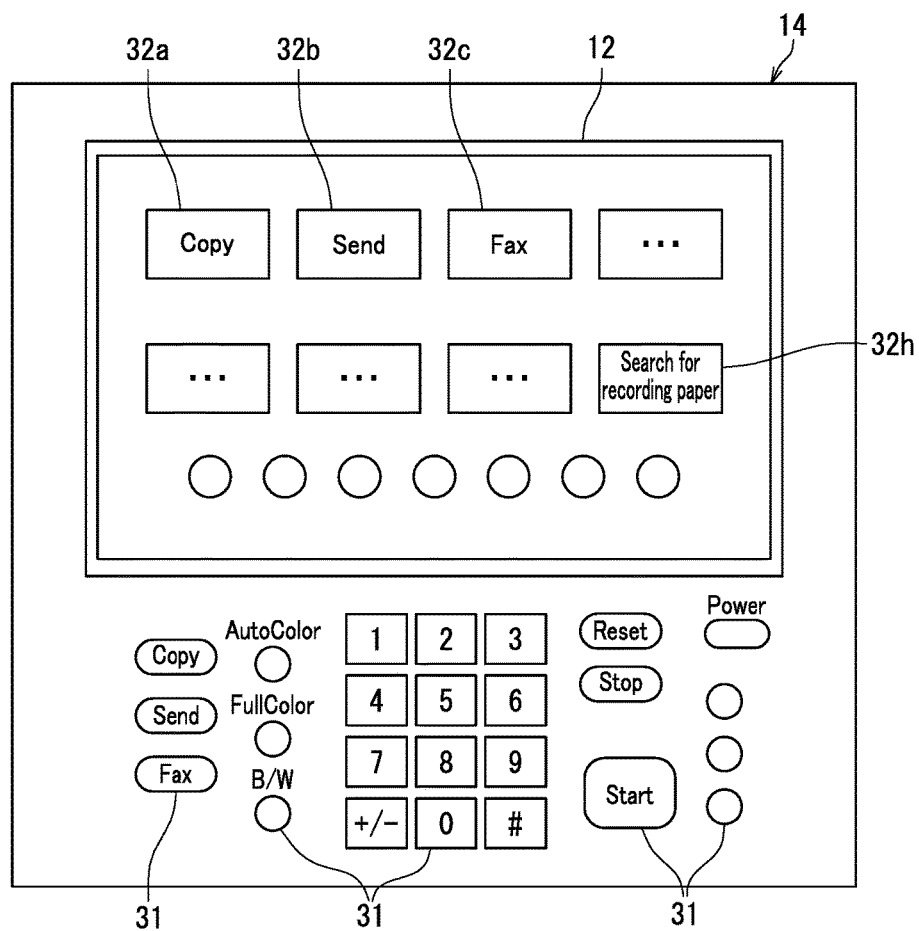
FIG. 5 is a plan view illustrating a first operation section and a first display of the image forming apparatus.

As illustrated in FIG. 5, the first display 12 is provided integrally with the first operation section 14. The first operation section 14 includes the touch panel disposed over the screen of the first display 12 and a plurality of hard keys 31. Usually, the first display 12 displays an initial screen. For example, a plurality of touch keys 32a to 32h associated with respective functions are displayed in the initial screen. When the user A as the owner of the particular recording paper performs a touch operation on the touch key 32*h* associated with a function for searching for the particular recording paper, the touch panel of the first operation section 14 detects the touch operation on the touch key 32*h*. As a result, information indicating the instruction for the search for the particular recording paper that should be on the exit tray is input from the first operation section 14 to the first controller 11. Through the above, the first controller 11 receives the instruction for the search. Note that the instruction for the search refers to the instruction for searching for the particular recording paper that should be on the exit tray.

When receiving the instruction for the search, the first controller 11 displays on the screen of the first display 12, history information J of jobs executed by the image forming apparatus 10 before the instruction for the search has been received (step S102). The history information J of the jobs is stored in the first storage 18. Every time a job is executed by the image forming apparatus 10, the history information J of the jobs is updated by the first controller 11. The history information J refers to information in which each job is associated with a user who has instructed the image forming apparatus 10 to execute the job. In the present embodiment, the user with which each job is associated in the history information J refers to address information of a terminal device 20 of the user.

As illustrated in FIG. 6, the history information J of each job include: a time at which an instruction for executing the job has been received; a time at which the job has been executed; address information of a terminal device of a user who has given the instruction for executing the job; and details of execution of the job, for example. The address information includes an address (for example, an IP address) of the terminal device 20 on the network N and the name of the user of the terminal device 20, for example. The details of execution of the job include a size of recording paper used in the job and/or a type of printing, for example. The type of printing refers to either of color printing and monochrome printing, for example.

The time at which the instruction for executing the job has been received refers to a time at which print data has been received as the job. The time at which the job has been executed refers to a time at which a print page indicated by the print data has been printed on recording paper. The first controller 11 is capable of determining the time at which the instruction for executing the job has been received and the time at which the job has been executed. The first controller 11 extracts the details of execution of the job from the print data.

The address information is included in the job, for example. Alternatively, the address information may be obtained as described below. First, administration data in which an ID of a user or a password is associated with the address information of the terminal device 20 of the user is stored in the first storage 18. The ID of the user or the password is added to the print data by the terminal device 20, and the print data is sent from the terminal device 20 to the image forming apparatus 10. The first controller 11 of the image forming apparatus 10 extracts the ID of the user or the password from the print data, and obtains the address information of the terminal device 20 of the user associated with the ID of the user or the password by searching the administration data.

The history information J may be information of all jobs executed during a period from a time at which the image forming apparatus 10 has been turned on to a time at which the instruction for the search has been received, for example. For example, in a situation in which the image forming apparatus 10 has been turned on at 7 a.m. and the instruction for the search has been received at 2 p.m., the history information J of all jobs executed during a period from 7 a.m. to 2 p.m. is displayed on the screen of the first display 12.

The history information J may be information of all jobs executed during a specific period including the time at which the instruction for the search has been received, for example. For example, in a situation in which the instruction for the search has been received at 2 p.m., the specific period is determined to be from one hour before 2 p.m. to one hour after 2 p.m., that is, from 1 p.m. to 3 p.m., and the history information J of all jobs executed during the period from 1 p.m. to 3 p.m. is displayed on the screen of the first display 12.

When the user A as the owner of the particular recording paper performs a touch operation on a display region of their job included in the history information J of the jobs displayed on the screen of the first display 12, the first controller 11 receives the selection of the job (the selected job) of the user A (step S103). That is, the touch panel of the first operation section 14 detects the touch operation on the display region of the job of the user A, and the selection of the job of the user A is output from the first operation section 14 to the first controller 11. The job of the user A refers to a job performed on the particular recording paper. Specifically, the job of the user A refers to a job executed by the image forming apparatus 10 in accordance with an instruction from the user A to obtain the particular recording paper. When the selection of the job (the selected job) of the user A is input, the first controller 11 selects jobs other than the selected job from the history information J of the jobs. Further, the first controller 11 selects each user who has given an instruction for executing at least one job among the jobs other than the selected job as the user B (step S104). Note that the user A who has given the instruction for executing the selected job is not included in the users B.

At this time, rather than determining as the users B respective users who have given instructions for executing all jobs other than the job of the user A, it is possible to further identify some jobs among the all other jobs on the basis of predetermined conditions, and determine as the users B respective users who have given instructions for executing these jobs. That is, the number of the users B may be reduced. For example, the first controller 11 selects from the history information J a predetermined number of jobs each executed before or after the execution of the job of the user A. Further, the first controller 11 selects each user who has given an instruction for executing at least one job among the predetermined number of jobs as the user B. Alternatively, in a situation in which a size of recording paper used in each job is stored as a detail of execution of the job included in the history information J, the first controller 11 obtains a size of the particular recording paper from details of execution of the job of the user A. Then, the first controller 11 identifies among the jobs other than the job of the user A, a plurality of first jobs in which recording paper of the same size as the particular recording paper used in the job of the user A has been used. The first controller 11 selects each user who has given an instruction for executing at least one of the plurality of first jobs as the user B. Alternatively, in a situation in which a type of printing (i.e., either of color printing and monochrome printing) is stored as a detail of execution of each job included in the history information J, the first controller 11 obtains a type of printing from details of execution of the job of the user A. Then, the first controller 11 identifies among the jobs other than the job of the user A, a plurality of second jobs in which the same type of printing as that performed in the job of the user A has been performed. The first controller 11 selects each user who has given an instruction for executing at least one of the plurality of second jobs as the user B.

Figures 7A, 7B:
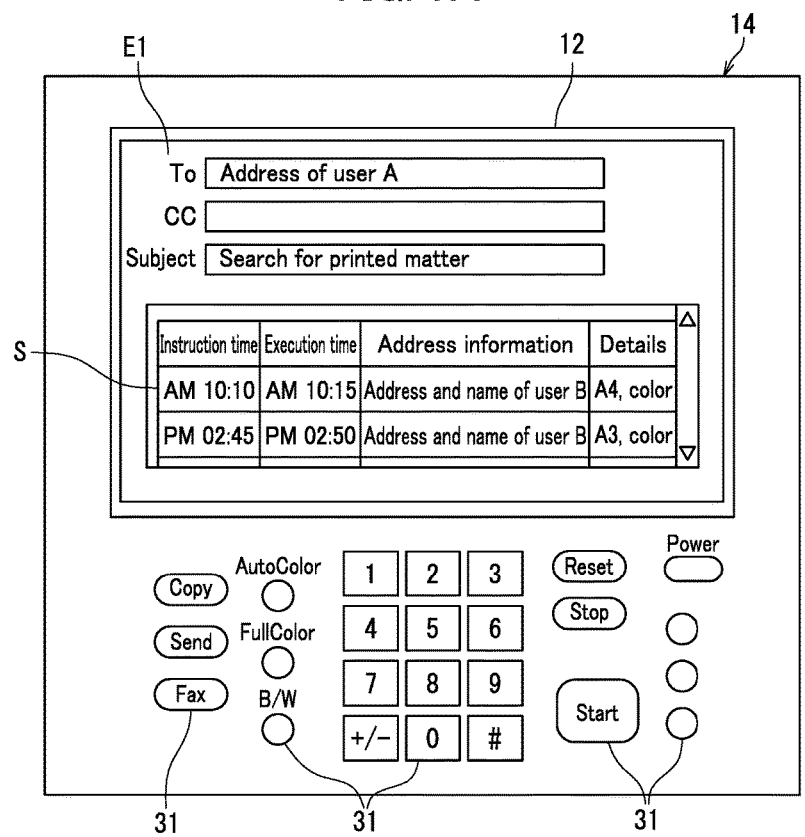
FIG. 7A is a diagram illustrating an example of a search list in which information of jobs executed through terminal devices of users supposed to have taken away recording paper and address information are listed.
FIG. 7B is a plan view illustrating the first display displaying the search list.

Upon selecting the users B, the first controller 11 obtains information of jobs executed through the terminal devices 20 of the respective users B and address information of the terminal devices 20 of the users B by referring to the history information J of the jobs (step S105). Then, the first controller 11 generates a search list S in which the information of the jobs and the address information are listed. The first controller 11 displays the search list S as illustrated in FIGS. 7A and 7B on the screen of the first display 12 (step S106). The search list S includes information indicating a list of users determined as the users B. Also, the search list S includes the address information of the terminal devices 20 of the users B. Therefore, the user A is able to see the search list S displayed on the screen of the first display 12 and know the address information of the terminal devices 20 of the users B.

Further, the first controller 11 prepares a search assist email E1 addressed to the address information of the terminal device 20 of the user A. The first controller 11 includes the search list S in the search assist email E1. The first controller 11 sends the search assist email E1 including the search list S through the first communication section 15 to the network N (step S107). The search assist email E1 including the search list S is received by a server on the network N, and sent from the server to the terminal device 20 of the user A. The user A is able to open the search assist email E1 received by the second communication section 25 of the terminal device 20 of the user A, and cause the search list S to be displayed on the screen of the second display 22.

Therefore, the user A is able to check the search list S through both the image forming apparatus 10 and the terminal device 20 of the user A.

Further, simultaneously with the generation and display of the search list S, the first controller 11 prepares an inquiry email E2 addressed to the address information of the terminal devices 20 of the users B. In the inquiry email E2, an inquiry message such as "Isn't someone else's printed matter mixed in the printed matter that you took away?" is written. The first controller 11 sends the inquiry email E2 through the first communication section 15 to the network N (step S108). The inquiry email E2 is received by a server on the network N, and sent from the server to the terminal devices 20 of the users B.

The terminal device 20 of each user B receives the inquiry email E2 through the second communication section 25, and displays the inquiry email E2 on the screen of the second display 22. By reading the inquiry message, each user B is able to recognize that they may have taken away the particular recording paper of the user A by mistake.

Figure 8:
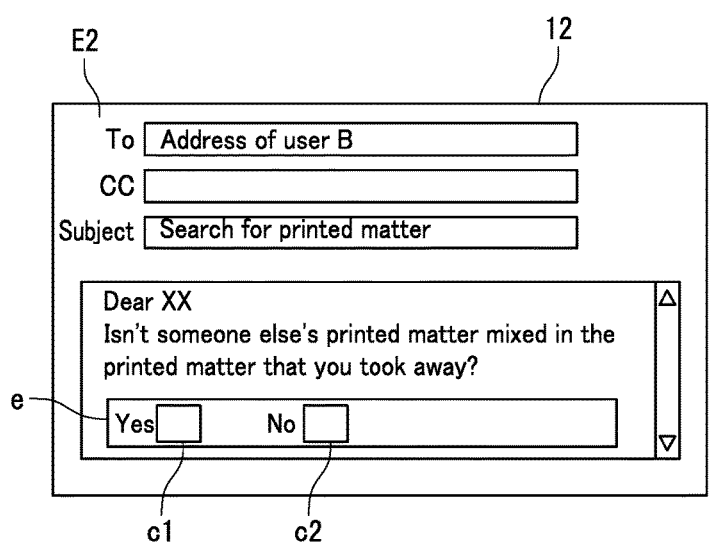
FIG. 8 is a diagram illustrating an example of an inquiry email sent from the image forming apparatus to the terminal devices of the users supposed to have taken away the recording paper.

FIG. 8 illustrates an example of the inquiry email E2. The inquiry email E2 includes an answer space "e" in addition to the inquiry message. A check box "c1" corresponding to "Yes" and a check box "c2" corresponding to "No" are displayed in the answer space "e".

Each user B checks either of the check boxes "c1" and "c2" in the answer space "e" of the email E2 and enters a reply message through the second operation section 24 of the terminal device 20 of the user B. The user B prepares a reply email E3 addressed to the image forming apparatus 10. The second controller 21 sends the reply email E3 through the second communication section 25 to the image forming apparatus 10 via a server on the network N.

Figure 9A:
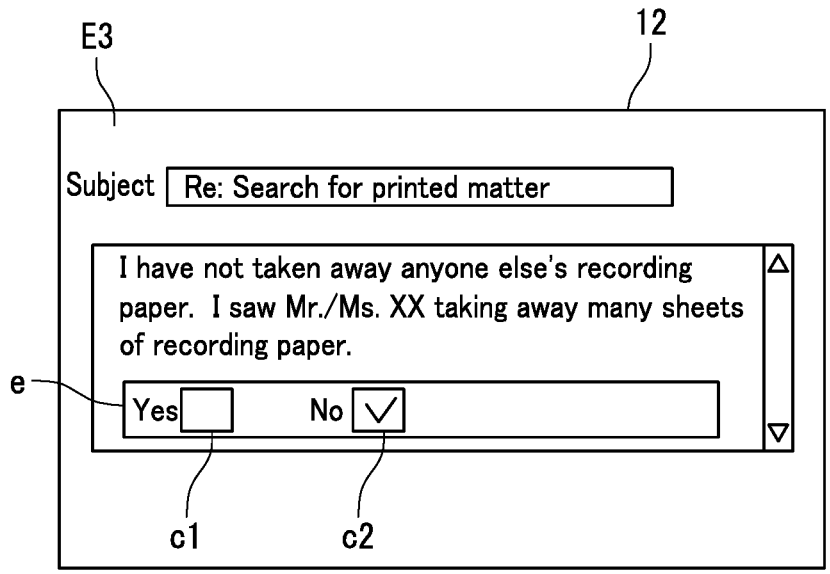
FIG. 9A is a diagram illustrating an example of a reply email sent to the image forming apparatus from a terminal device of a user who has not taken away the recording paper.

FIG. 9A illustrates an example of the reply email E3 sent from the terminal device 20 of the user Ba to the image forming apparatus 10. In this reply email E3, the check box "c2" corresponding to "No" is checked in the answer space "e". Further, a reply message "I have not taken away anyone else's recording paper. I saw Mr./Ms. XX taking away many sheets of recording paper." is written in the reply email E3.

Figure 9B:
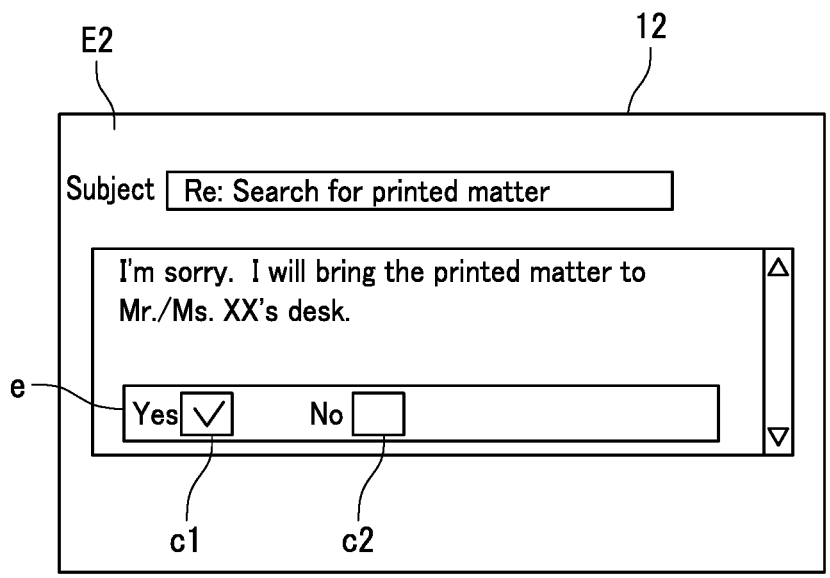
FIG. 9B is a diagram illustrating an example of a reply email sent to the image forming apparatus from a terminal device of a user who has taken away the recording paper.

FIG. 9B illustrates an example of the reply email E3 sent from the terminal device 20 of the user Bb to the image forming apparatus 10. In this reply email E3, the check box "c1" corresponding to "Yes" is checked in the answer space "e". Further, a reply message "I'm sorry. I will bring the printed matter to Mr./Ms. XX's desk." is written in the reply email E3. The reply message is not limited to the above message, and may be as follows: "I took away the recording paper by mistake. I cannot go to return the recording paper right now, so please come to XX to get it."

The image forming apparatus 10 receives each reply email E3 through the first communication section 15, and displays the reply email E3 on the screen of the first display 12 (step S109). Also, on the basis of information indicating which of the check boxes "c1" and "c2" is checked, the first controller 11 determines whether or not the user B who has sent the reply email E3 has taken away the particular recording paper (step S110).

For example, when the first communication section 15 receives the reply email E3 from the terminal device 20 of the user Ba, the first controller 11 displays the reply email E3 as illustrated in FIG. 9A on the screen of the first display 12 (step S109). Further, the first controller 11 determines that the user Ba of the terminal device (a second terminal device) 20 which has sent the reply email E3 has not taken away the particular recording paper ("NO" at step S110) since the check box "c2" c is checked in the reply email E3. Information indicating that the check box "c2" is checked is information indicating absence of the particular recording paper. On the basis of the result of the determination by the first controller 11, information of a job executed through the terminal device 20 which has sent the reply email E3 and address information of the same terminal device 20 are deleted from the original search list S (see FIGS. 7A and 7B) by the first controller 11 to update the search list S. The first controller 11 displays the updated search list S on the screen of the first display 12 (step S111). That is, the first controller 11 deletes from the search list S the supposed user of the terminal device 20 which has sent information indicating absence of the particular recording paper.

Further, the first controller 11 prepares again the search assist email E1 addressed to the address information of the terminal device 20 of the user A. The first controller 11 includes in the search assist email E1, the reply message illustrated in FIG. 9A and the updated search list S. The first controller 11 sends this search assist email E1 through the first communication section 15 to the terminal device 20 of the user A via a server on the network N (step S112). Therefore, the user A is able to open the search assist email E1 received again by the terminal device 20 of the user A and cause the reply message illustrated in FIG. 9A and the updated search list S to be displayed on the screen of the second display 22.

Therefore, the user A is able to check the reply message illustrated in FIG. 9A and the updated search list S through both the image forming apparatus 10 and the terminal device 20 of the user A.

Further, every time the image forming apparatus 10 receives the reply email E3 in which the check box "c2" is checked, information of a job executed through the terminal device 20 which has sent the reply email E3 and address information of the same terminal device 20 are deleted from the search list S to update the search list S. Through the above, address information of the terminal device 20 of the user Ba is deleted from the search list S, resulting in a reduction in the number of the users B. Therefore, it becomes easy to identify (or narrow the scope of the search for) the user Bb.

Also, when the first communication section 15 receives the reply email E3 (see FIG. 9B) from the terminal device 20 of the user Bb, the first controller 11 displays the reply email E3 on the screen of the first display 12 (step S109). Further, the first controller 11 determines that the user Bb of the terminal device (a first terminal device) 20 which has sent the reply email E3 has taken away the particular recording paper of the user A ("YES" at step S110) since the check box "c1" is checked in the reply email E3. Information indicating that the check box "c1" is checked is information indicating presence of the particular recording paper. On the basis of the result of the determination by the first controller 11, the first controller 11 erases the search list S displayed on the screen of the first display 12. Then, the first controller 11 displays on the screen of the first display 12 address information of the terminal device 20 of the user Bb which has sent the reply email E3 (step S113).

At the same time, the first controller 11 prepares again the search assist email E1 addressed to the address information of the terminal device 20 of the user A. The first controller 11 includes in the search assist email E1, the reply message illustrated in FIG. 9B and the address information of the terminal device 20 of the user Bb. The first controller 11 sends this search assist email E1 through the first communication section 15 to the terminal device 20 of the user A via a server on the network N (step S114). That is, the first controller 11 sends information indicating that the particular recording paper has been taken away by the user Bb of the first terminal device to the terminal device 20 of the user A who has given the instruction for executing the selected job. Therefore, the user A is able to open the search assist email E1 received again by the terminal device 20 of the user A and cause the reply message illustrated in FIG. 9B and the address information of the terminal device 20 of the user Bb to be displayed on the screen of the second display 22.

Therefore, the user A is able to check the reply message illustrated in FIG. 9B and the address information of the terminal device 20 of the user Bb through both the image forming apparatus 10 and the terminal device 20 of the user A.

The user A prepares through the terminal device 20 of the user A, an email for the user Bb addressed to the address information of the terminal device 20 of the user Bb. The user A is able to send the email for the user Bb from the terminal device 20 of the user A to the terminal device 20 of the user Bb by writing a message for requesting return of the particular recording paper in the email. Alternatively, the user A is able to request return of the particular recording paper by going to meet the user Bb in person.

Further, the first controller 11 prepares a search completion notification email E4 addressed to the address information of the terminal devices 20 of the users B indicated in the original search list S illustrated in FIGS. 7A and 7B. The first controller 11 sends the search completion notification email E4 through the first communication section 15 via a server on the network N to the terminal devices 20 of the users B indicated in the original search list S (step S115).

Figure 10:
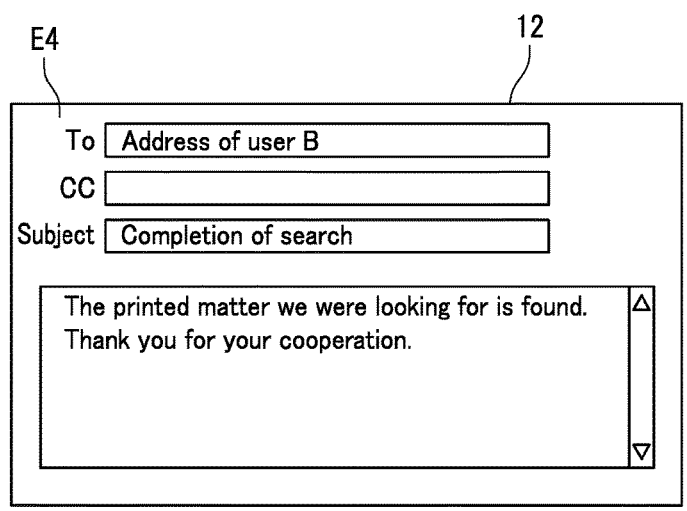
FIG. 10 is a diagram illustrating an example of a search completion notification email sent from the image forming apparatus to the terminal devices of the users supposed to have taken away the recording paper.

FIG. 10 illustrates an example of the search completion notification email E4 sent from the image forming apparatus 10 to the terminal devices 20 of the users B. In the search completion notification email E4, the following search completion message is written: "The printed matter we were looking for is found. Thank you for your cooperation."

Each user B causes the email E4 received by the terminal device 20 of the user B to be displayed on the screen of the second display 22. Each user B is able to know completion of the search for the particular recording paper of the user A by reading the search completion message.

In the present embodiment, when the instruction for searching for the recording paper of the user A is given through an operation on the first operation section 14 of the image forming apparatus 10, the search list S listing the address information of the terminal devices 20 of the users B is generated. The search list S is displayed on the screen of the first display 12 of the image forming apparatus 10 and the screen of the second display 22 of the terminal device 20 of the user A. Further, the search list S is updated on the basis of answers from the terminal devices 20 of the users B by deleting from the search list S the address information of the terminal device 20 of the user Ba. Therefore, it is easy for the user A to identify the user Bb on the basis of the updated search list S.

Also, a plurality of messages are exchanged between the image forming apparatus 10 and each terminal device 20. A first message is the inquiry message "Isn't someone else's printed matter mixed in the printed matter that you took away?" A second message is the reply message "I have not taken away anyone else's recording paper. I saw Mr./Ms. XX taking away many sheets of recording paper." A third message is the reply message "I'm sorry. I will bring the printed matter to Mr./Ms. XX's desk." A fourth message is the search completion message "The printed matter we were looking for is found. Thank you for your cooperation." Therefore, the user A and the users B are able to know a status of progress of the search for the particular recording paper of the user A to advance the search in cooperation with one another. As a result, the search for the particular recording paper smoothly progresses, and the particular recording paper can be immediately returned to the user A.

Note that in the above-described embodiment, the inquiry message is sent from the image forming apparatus 10 to the terminal devices 20 of the users B via the network N. However, an image of a print page printed on the particular recording paper of the user A may be sent together with the inquiry message by the first controller 11 of the image forming apparatus 10 through the first communication section 15 to the terminal devices 20 of the users B. In this case, every time a job is executed, the image forming apparatus 10 updates the history information J by adding information about the job to the history information J. Further, every time a job is executed, the image forming apparatus 10 stores in the first storage 18 an image of a print page printed on recording paper in association with the executed job. In the history information J, each job is further associated with an image formed on recording paper through execution of the job. When the particular recording paper of the user A is taken away and the inquiry message is sent to the terminal devices 20 of the users B, the print page printed on the particular recording paper of the user A is read from the first storage 18 and sent together with the inquiry message. The print page printed on the particular recording paper is an image associated with the selected job in the history information J. Each of the terminal devices 20 of the users B receives together with the inquiry message the print page printed on the particular recording paper, and displays the print page on the screen of the second display 22. Therefore, each user B is able to easily determine whether or not they have taken away the particular recording paper by seeing a print page printed on recording paper that they have.

However, when a print page printed on recording paper is stored in the first storage 18 every time a job is executed, shortage of the capacity of the first storage 18 may occur due to a large data volume of the print page. Also, a volume of data sent from the image forming apparatus 10 to the terminal devices 20 becomes excessively large. In this case, the first controller 11 compresses the print page by a compression method such as JPEG. The first controller 11 preferably stores the compressed image in the first storage 18 and sends the compressed image from the image forming apparatus 10 to the terminal devices 20. Further, as time passes from when the print page has been printed on the particular recording paper, it becomes less likely that an instruction for searching for the particular recording paper will be given. Therefore, the first controller 11 may erase the print page from the first storage 18 when a predetermined time has elapsed from when the print page has been printed on the particular recording paper. Also, the first controller 11 is preferably capable of choosing whether or not to send the print page printed on the particular recording paper to the terminal devices 20 of the users B so that contents of the print page will not be seen by the unspecified users B when it is chosen not to send the print page.

Further, it is highly likely that the user Bb has been witnessed in the vicinity of the image forming apparatus 10. Therefore, the image forming apparatus 10 may send a message for requesting cooperation in the search for the particular recording paper to a terminal device 20 located in the vicinity of the image forming apparatus 10.

Figure 11A:
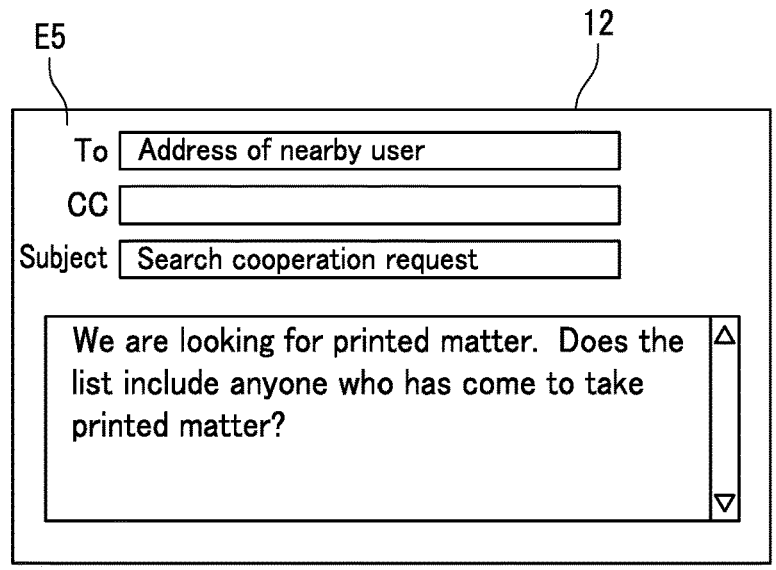
FIG. 11A is a diagram illustrating an example of a search cooperation request email sent from the image forming apparatus to a terminal device located in the vicinity of the image forming apparatus.

For example, address information of the terminal device 20 located in the vicinity of the image forming apparatus 10 is stored in the first storage 18 in advance. When an instruction for requesting cooperation in the search is given by the user A through an operation on the first operation section 14, the first controller 11 prepares a search cooperation request email E5 addressed to the address information of the terminal device 20 located in the vicinity of the image forming apparatus 10 as illustrated in FIG. 11A, and sends the search cooperation request email E5 through the first communication section 15 to the terminal device 20 located in the vicinity of the image forming apparatus 10. The second controller 21 of the terminal device 20 located in the vicinity of the image forming apparatus 10 causes the second display 22 to display the search cooperation request email E5.

Figure 11B:
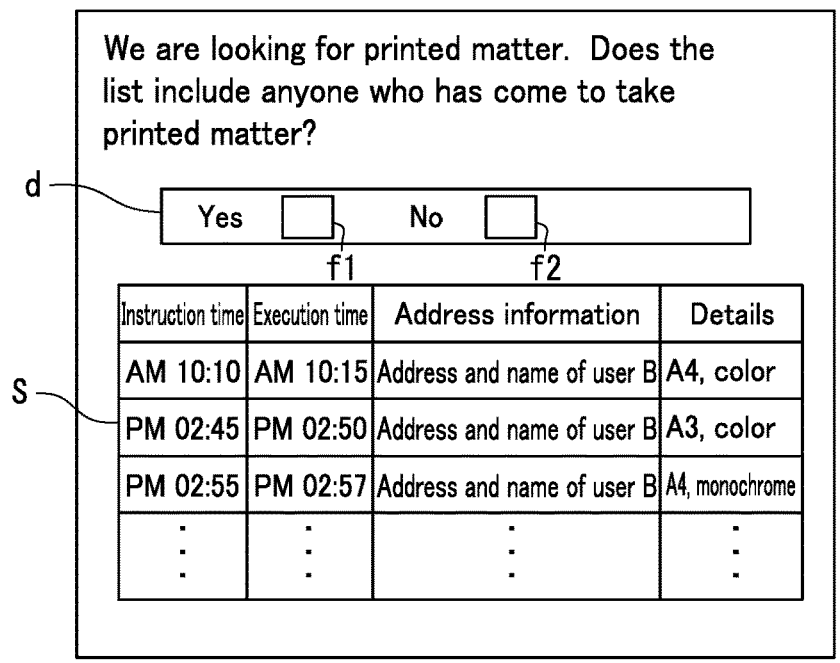
FIG. 11B is a diagram illustrating all contents of the search cooperation request email.

As illustrated in FIG. 11B, the search cooperation request email E5 includes a search cooperation request message, an answer space "d", and the search list S. The search cooperation request message reads "We are looking for printed matter. Does the list include anyone who has come to take printed matter?", for example. In response to a scrolling operation performed on the screen of the second display 22 through the second operation section 24, the second controller 21 controls the second display 22 such that the message, the answer space "d", and the search list S can all be seen. The answer space "d" includes a check box "f1" corresponding to "Yes" and a check box "f2" corresponding to "No". When the user of the terminal device 20 located in the vicinity of the image forming apparatus 10 reads the search cooperation request message and accepts the request for cooperation in the search for the particular recording paper, the user checks either of the check boxes "f1" and "f2" and enters a reply message through an operation on the second operation section 24. In response, the second controller 21 prepares a reply email that is addressed to the image forming apparatus 10 and that includes information indicating which of the check boxes "f1" and "f2" is checked and information indicating the reply message. The second controller 21 sends the prepared reply email through the second communication section 25 to the image forming apparatus 10. In the search for the particular recording paper, the user A is able to utilize the reply email displayed on the screen of the first display 12 of the image forming apparatus 10 by checking which of the check boxes "f1" and "f2" is checked and reading the reply message.

Also, as for a sending user who is the user Bb who has taken away recording paper in the past, the first controller 11 of the image forming apparatus 10 calculates a cumulative count of the number of times the sending user has taken away recording paper by mistake. The sending user is the user of the terminal device 20 which has sent information indicating presence of the particular recording paper to the first controller 11. The first controller 11 calculates a cumulative count of the number of times of a determination result for the sending user from when the sending user has sent the information indicating presence of the particular recording paper to the first controller 11 for the first time. The cumulative count of the number of times of the determination result indicates the number of times the sending user has been determined as the user Bb by the first controller 11. In a situation in which the sending user is included in the users B in a next search for recording paper, the first controller 11 may prepare an inquiry message preset as an inquiry message corresponding to the cumulative count and send the inquiry message to the terminal device 20 of the sending user through the first communication section 15.

For example, the first controller 11 stores in the first storage 18 a default value (=0) of the cumulative count in association with address information of respective terminal devices 20. Further, every time the first controller 11 receives the reply email E3, the first controller 11 determines whether or not the check box "c1" is checked in the reply email E3. When the check box "c1" is checked, the first controller 11 increments a cumulative count associated with address information of the terminal device 20 which has sent the reply email E3.

Also, in every search for recording paper, the first controller 11 refers to cumulative counts associated with the address information of the respective terminal devices 20. The first controller 11 determines first sending users who are sending users of terminal devices 20 address information of which is associated with cumulative counts larger than a predetermined value. Then, the first controller 11 determines for each of the first sending users whether or not the first sending user is included in the users B. In a situation in which the first sending user is included in the users B, the first controller 11 sends an inquiry message corresponding to the cumulative count to the terminal device 20 of the first sending user. In the inquiry message corresponding to the cumulative count, the contents of the inquiry message are changed, or characters of the inquiry message are displayed in a larger scale, for example. Thus, the inquiry message can be made more impressive for the first sending user who has taken away the particular recording paper by mistake many times so that the search will be completed in a shorter time. Also, in a situation in which the first sending user is included in the users B, the address information of the terminal device 20 of the first sending user may be placed higher in the search list S to attract more attention to the first sending user.

Also, when the first controller 11 sends the inquiry email E2 to the terminal device 20 of each user B, the first controller 11 may send the same email E2 to a mobile terminal of the user B through the first communication section 15 via the network N. The mobile terminal is a tablet computer, for example. In this case, address information of mobile terminals of respective users is stored in the first storage 18 in advance in association with the address information of the terminal devices 20 of the respective users. When the first controller 11 sends the inquiry email E2 to the terminal devices 20 of the users B, the first controller 11 reads out from the first storage 18 the address information of the mobile terminals associated with the address information of the respective terminal devices 20. The first controller 11 prepares the inquiry email E2 addressed to the address information of the mobile terminals and sends the inquiry email E2 through the first communication section 15 to the mobile terminals via a server on the network N. Through the above, an opportunity for each user B to see the inquiry email E2 can be increased to prevent the user B from failing to notice the email E2.

The above-described embodiment has been described using the multifunction peripheral as an embodiment of the image forming apparatus according to the present disclosure. However, the multifunction peripheral is merely an example of the image forming apparatus, and the present disclosure is applicable to other image forming apparatuses such as a copier, a printer, and a facsimile machine.

Also, the configuration and processing described above in the embodiment with reference to FIGS. 1 to 11 are merely examples, and the present disclosure is not limited to the configuration and processing.

What is claimed is:

1. An image forming system comprising an image forming apparatus and a plurality of terminal devices connected to the image forming apparatus via a network, wherein
the image forming apparatus includes:
an image forming section that forms an image on recording paper;
a first display;
a first operation section that receives an instruction to the image forming apparatus;
a first communication section that performs communication with each of the terminal devices via the network;
an exit tray that receives recording paper ejected after image formation thereon by the image forming section;
storage storing therein history information in which each job for forming an image on recording paper is associated with a user who has instructed the image forming apparatus to execute the job; and
a first controller,
when an instruction for searching for particular recording paper taken away from the exit tray is given through an operation on the first operation section, the first controller reads out the history information from the storage, and displays the history information on the first display,
when from among a plurality of jobs included in the history information, a job is selected through an operation on the first operation section as a selected job performed on the particular recording paper as a target of the search, the first controller selects from the history information a supposed user supposed to have taken away the particular recording paper from the exit tray on the basis of the selected job, and sends an inquiry message to a terminal device of the supposed user through the first communication section via the network to inquire whether or not the supposed user has the particular recording paper,
the terminal devices each include:
a second display;
a second operation section that receives an instruction to the terminal device;
a second communication section that performs communication with the image forming apparatus via the network; and
a second controller,
when the inquiry message is received by the second communication section, the second controller displays the inquiry message on the second display, and
when information indicating presence or absence of the particular recording paper is input as an answer to the inquiry message through an operation on the second operation section, the second controller sends the information indicating presence or absence of the particular recording paper through the second communication section to the image forming apparatus via the network.

2. The image forming system according to claim 1, wherein
when information indicating presence of the particular recording paper is received by the first communication section, the first controller of the image forming apparatus determines that the particular recording paper has been taken away by a user of a first terminal device that is one of the terminal devices and that has sent the information indicating presence of the particular recording paper, and
when information indicating absence of the particular recording paper is received by the first communication section, the first controller of the image forming apparatus determines that the particular recording paper has not been taken away by a user of a second terminal device that is one of the terminal devices and that has sent the information indicating absence of the particular recording paper.

3. The image forming system according to claim 2, wherein
information indicating that the particular recording paper has been taken away by the user of the first terminal device is sent by the first controller of the image forming apparatus to a terminal device of a user who has instructed the image forming apparatus to execute the selected job.

4. The image forming system according to claim 2, wherein
when the information indicating presence of the particular recording paper is received by the first communication section, the first controller of the image forming apparatus determines that the particular recording paper has been taken away by a sending user who is the user of the first terminal device that has sent the information indicating presence of the particular recording paper, and increments a cumulative count of the number of times of a determination result for the sending user, and
when the sending user is determined as the supposed user in a next search, the first controller sends a message preset as a message corresponding to the cumulative count to the first terminal device of the sending user through the first communication section via the network.

5. The image forming system according to claim 1, wherein
the first controller of the image forming apparatus selects as the supposed user a user who has given an instruction for executing at least one job that is among the plurality of jobs included in the history information and that is not the selected job.

6. The image forming system according claim 1, wherein the first controller of the image forming apparatus selects from among the plurality of jobs included in the history information, a predetermined number of jobs each executed before or after the selected job, and selects as the supposed user a user who has given an instruction for executing at least one job among the predetermined number of jobs.

7. The image forming system according to claim 1, wherein
when a reply message is input through the second operation section, the second controller of the terminal device sends the reply message together with the answer through the second communication section to the image forming apparatus via the network.

8. The image forming system according to claim 1, wherein
when information indicating presence of the particular recording paper is received by the first communication section, the first controller of the image forming apparatus sends a search completion message through the first communication section to the terminal device of the supposed user via the network.

9. The image forming system according to claim 1, wherein
upon selecting the supposed user, the first controller generates a search list that includes information indicating a list of users each selected as the supposed user.

10. The image forming system according to claim 9, wherein
the first controller sends the search list through the first communication section via the network to a terminal device of a user who has instructed the image forming apparatus to execute the selected job.

11. The image forming system according to claim 9, wherein
when information indicating absence of the particular recording paper is received by the first communication section, the first controller of the image forming apparatus deletes from the search list a supposed user of a terminal device which has sent the information indicating absence of the particular recording paper.

12. The image forming system according to claim 1, wherein
in the history information, each job for forming an image on recording paper is further associated with the image formed on the recording paper through execution of the job,
when sending the inquiry message to the terminal device of the supposed user, the first controller of the image forming apparatus reads out from the storage an image associated with the selected job in the history information, and sends the image associated with the selected job through the first communication section to the terminal device of the supposed user via the network, and
when the image associated with the selected job is received by the second communication section together with the inquiry message, the second controller of the terminal device displays the inquiry message and the image associated with the selected job on the second display.

13. The image forming system according to claim 1, wherein
when sending the inquiry message to the terminal device of the supposed user, the first controller of the image forming apparatus sends a message for requesting cooperation in the search through the first communication section to a predetermined terminal device via the network.

14. The image forming system according to claim 1, wherein
when sending the inquiry message to the terminal device of the supposed user, the first controller of the image forming apparatus also sends the inquiry message to a mobile terminal of the supposed user through the first communication section via the network.

15. An image forming apparatus connected to a plurality of terminal devices via a network, the image forming apparatus comprising:
an image forming section that forms an image on recording paper;
a first display;
a first operation section that receives an instruction to the image forming apparatus;
a first communication section that performs communication with each of the terminal devices via the network;
an exit tray that receives recording paper ejected after image formation thereon by the image forming section;
storage storing therein history information in which each job for forming an image on recording paper is associated with a user who has instructed the image forming apparatus to execute the job; and
a first controller, wherein
when an instruction for searching for particular recording paper taken away from the exit tray is given through an operation on the first operation section, the first controller reads out the history information from the storage, and displays the history information on the first display, and
when from among a plurality of jobs included in the history information, a job is selected through an operation on the first operation section as a selected job performed on the particular recording paper as a target of the search, the first controller selects from the history information a supposed user supposed to have taken away the particular recording paper from the exit tray on the basis of the selected job, and sends an inquiry message to a terminal device of the supposed user through the first communication section via the network to inquire whether or not the supposed user has the particular recording paper.

* * * * *